US012075219B2

(12) United States Patent
Tamamura et al.

(10) Patent No.: US 12,075,219 B2
(45) Date of Patent: Aug. 27, 2024

(54) NOISE-CANCELLING HEADPHONE

(71) Applicant: Audio-Technica Corporation, Tokyo (JP)

(72) Inventors: Akihito Tamamura, Fukui (JP); Hideki Matsui, Fukui (JP)

(73) Assignee: AUDIO-TECHNICA CORPORATION, Tokyo (JP)

(*) Notice: Subject to any disclaimer, the term of this patent is extended or adjusted under 35 U.S.C. 154(b) by 147 days.

(21) Appl. No.: 17/995,013

(22) PCT Filed: Dec. 1, 2020

(86) PCT No.: PCT/JP2020/044725
§ 371 (c)(1),
(2) Date: Sep. 29, 2022

(87) PCT Pub. No.: WO2021/199498
PCT Pub. Date: Oct. 7, 2021

(65) Prior Publication Data

US 2023/0164486 A1 May 25, 2023

(30) Foreign Application Priority Data

Apr. 3, 2020 (JP) ................................ 2020-067948

(51) Int. Cl.
*H04R 3/04* (2006.01)
*H04R 5/033* (2006.01)

(52) U.S. Cl.
CPC ............... *H04R 3/04* (2013.01); *H04R 5/033* (2013.01); *H04R 2460/01* (2013.01)

(58) Field of Classification Search
None
See application file for complete search history.

(56) References Cited

U.S. PATENT DOCUMENTS

| | | | | |
|---|---|---|---|---|
| 8,472,636 B2 * | 6/2013 | Sibbald | ................ | H04R 1/1083 381/71.7 |
| 9,536,515 B2 * | 1/2017 | Oide | ................ | G10K 11/17857 |

(Continued)

FOREIGN PATENT DOCUMENTS

| | | |
|---|---|---|
| GB | 2434708 A | 1/2006 |
| GB | 2534662 A | 11/2015 |

(Continued)

*Primary Examiner* — Paul W Huber
(74) *Attorney, Agent, or Firm* — WC&F IP

(57) ABSTRACT

A noise-cancelling headphone 1 includes a headphone unit (14), a baffle plate (13) to which the headphone unit is attached, an ear pad (12) attached to the baffle plate, a housing (11) attached to the baffle plate, a first microphone (16) that collects external noise, a first buffer amplifier unit (151) that performs impedance conversion to a signal from the first microphone and output the impedance-converted signal, a second microphone (17) that collects internal noise, a second buffer amplifier unit (152) that performs impedance conversion to a signal from the second microphone and outputs the impedance-converted signal, and a noise-cancelling signal generating circuit (154) that generates a noise-cancelling signal, based on a combined signal by combining the signal from the first buffer amplifier unit with the signal from the second buffer amplifier unit.

7 Claims, 7 Drawing Sheets

(56) References Cited

U.S. PATENT DOCUMENTS

| | | | | |
|---|---|---|---|---|
| 10,460,718 | B2 * | 10/2019 | Sibbald | G10K 11/17861 |
| 10,531,179 | B2 * | 1/2020 | Gurunathan | H04R 1/1083 |
| 10,715,903 | B2 * | 7/2020 | Rauschmayer | H04R 29/001 |
| 2011/0158419 | A1 | 6/2011 | Theverapperuma et al. | |
| 2014/0169579 | A1 | 6/2014 | Azmi | |

FOREIGN PATENT DOCUMENTS

| | | | |
|---|---|---|---|
| JP | 2007028354 | A | 2/2007 |
| JP | 2012023637 | A | 2/2012 |
| WO | 2009041012 | A1 | 4/2009 |

* cited by examiner

NOISE-CANCELLING HEADPHONE

TECHNICAL FIELD

The present invention relates to a noise-cancelling headphone.

BACKGROUND ART

A noise-cancelling headphone collects so-called noise with a microphone and mutes (cancels) the noise by using a cancelling sound corresponding to a cancelling signal in antiphase to the collected noise.

One of the types of noise cancellation is a feed-forward type (hereinafter referred to as "FF type"). An FF type noise-cancelling headphone collects noise outside (around) the noise-cancelling headphone and generates a cancelling signal.

Herein, a cancelling signal generating circuit and the like in the FF type noise-cancelling headphone are designed on the assumption that an ear pad of the noise-cancelling headphone and a head are brought into close contact with each other without any gap when the noise-cancelling headphone is worn on the head of a user. However, a shape of a user's head varies from person to person. For this reason, a gap is generated between the ear pad and the head for some users. The FF type noise-cancelling headphone do not assume that noise comes into the user's ear through the gap. Therefore, the FF type noise-cancelling headphone does not enable the noise through the gap to be cancelled.

A measure to solve such a problem of the FF type noise-cancelling headphone includes a hybrid type noise-cancelling headphone (For example, see PTL 1).

CITATION LIST

Patent Literature

[PTL 1] JP2012-023637 A

The hybrid type noise-cancelling headphone collects noise in a space (front air chamber) between an ear pad and a head and generates a cancelling signal. That is, the hybrid type noise-cancelling headphone outputs a cancelling sound corresponding to a cancelling signal generated by collecting external noise and outputs a cancelling sound corresponding to the cancelling signal generated by collecting the noise in the front air chamber. Thus, the hybrid type noise-cancelling headphone achieves a higher cancelling effect than the FF type noise-cancelling headphone.

However, the hybrid type noise-cancelling headphone requires, in addition to the circuit for generating the cancelling signal corresponding to the external noise, a circuit (error correcting noise cancelling circuit) for generating the cancelling signal corresponding to the noise in the front air chamber. Further, the hybrid type noise-cancelling headphone requires an adder that adds the cancelling signal corresponding to the external noise and the cancelling signal corresponding to the noise in the front air chamber. Therefore, the hybrid type noise-cancelling headphone has a more complex circuit configuration and is also more expensive.

SUMMARY OF INVENTION

Technical Problem

An object of the present invention is to achieve a high cancelling effect with a simple configuration.

Solution to Problem

A noise-cancelling headphone according to the present invention includes: a headphone unit configured to output a sound wave corresponding to an audio signal; a baffle plate to which the headphone unit is attached; an ear pad attached to the baffle plate; a housing attached to the baffle plate; a first microphone configured to collect external noise outside the housing, a first buffer amplifier unit configured to perform impedance conversion to a signal from the first microphone and output the impedance-converted signal; a second microphone configured to collect internal noise inside a front air chamber formed by the headphone unit, the baffle plate, the ear pad, and a head of a user when the noise-cancelling headphone is worn on the user's head; a second buffer amplifier unit configured to perform impedance conversion to a signal from the second microphone and output the impedance-converted signal; and a noise-cancelling signal generation circuit configured to generate a noise-cancelling signal, based on a combined signal by combining the signal from the first buffer amplifier unit with the signal from the second buffer amplifier unit.

Advantageous Effects of Invention

The present invention achieves a high cancelling effect with a simple configuration.

DESCRIPTION OF EMBODIMENTS

Embodiments of a noise-cancelling headphone according to the present invention are described below with reference to the attached drawings.

Figure 1:
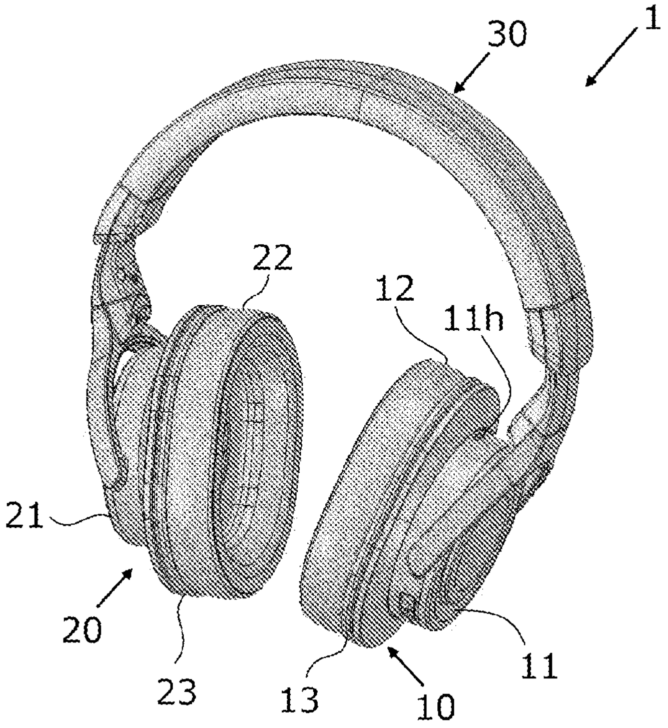
FIG. 1 is a perspective view of an embodiment of a noise-cancelling headphone according to the present invention.

FIG. 1 is a perspective view of an embodiment of the noise-cancelling headphone according to the present invention.

A noise-cancelling headphone 1 is worn on a head of a user of the noise-cancelling headphone 1 and outputs a sound wave corresponding to an audio signal from a sound source (not illustrated) such as a portable music player toward an ear of the user.

The "user" is a user of the noise-cancelling headphone 1.

The noise-cancelling headphone 1 includes a left sound emitting unit 10, a right sound emitting unit 20, and a connecting member 30. The left sound emitting unit 10 and the right sound emitting unit 20 constitute a pair of sound emitting units. The pair of sound emitting units is worn around the ear of the user on a temporal region HD of the user and outputs the sound wave corresponding to the audio signal from the sound source. In a state in which the noise-cancelling headphone 1 is worn on the head of the user (hereinafter referred to as "worn state"), the noise-cancelling headphone 1 forms a front air chamber SF (see FIG. 2) described later between the noise-cancelling headphone 1 and the temporal region HD.

The left sound emitting unit 10 is worn around a left ear LE (see FIG. 2) on the temporal region HD of the user and outputs the sound wave corresponding to the audio signal from the sound source. The left sound emitting unit 10 includes a housing 11, an ear pad 12, a baffle plate 13, and a headphone unit 14 (see FIG. 2).

The housing 11 is attached to the baffle plate 13 and accommodates the headphone unit 14 and the like. The housing 11 has a cup shape. The housing 11 is made of, for example, a synthetic resin such as acrylonitrile-butadiene-styrene (ABS) resin. The housing 11 includes a sound collecting hole 11*h*. The sound collecting hole 11*h* allows communication between the outside and the inside (rear air chamber SR described later (see FIG. 2)) of the housing 11. The sound collecting hole 11*h* is a first sound collecting hole in the present invention.

The ear pad 12 is attached to the baffle plate 13 and functions as a cushion between the baffle plate 13 and the temporal region HD. The ear pad 12 has an elliptical ring shape. The ear pad 12 abuts on the temporal region HD of the user. An elastic material such as urethane foam, which is easily deformable, is used for the ear pad 12.

The baffle plate 13 holds the headphone unit 14. The baffle plate 13 separates the front air chamber SF and the rear air chamber SR. The baffle plate 13 includes a sound collecting hole 13*h* (see FIG. 2). The sound collecting hole 13*h* allows communication between the front air chamber SF and the rear air chamber SR. The sound collecting hole 13*h* is a second sound collecting hole in the present invention.

The right sound emitting unit 20 is worn around a right ear on the temporal region HD of the user and outputs the sound wave corresponding to the audio signal from the sound source. The right sound emitting unit 20 includes a housing 21, an ear pad 22, and a baffle plate 23. The housing 21, the ear pad 22, and the baffle plate 23 have the same functions and configurations as the housing 11, the ear pad 12, and the baffle plate 13, respectively. Thus, a specific description of the configuration and the like of the right sound emitting unit 20 is omitted.

The connecting member 30 connects the left sound emitting unit 10 and the right sound emitting unit 20 and supports the left sound emitting unit 10 and the right sound emitting unit 20. The connecting member 30 fixes the noise-cancelling headphone 1 to the head of the user. In the worn state of the noise-cancelling headphone 1, the connecting member 30 applies side pressure to the right and left sound emitting units 10 and 20 toward the temporal region HD side of the user and fixes the right and left sound emitting units 10 and 20 to the temporal region HD of the user.

Figure 2:
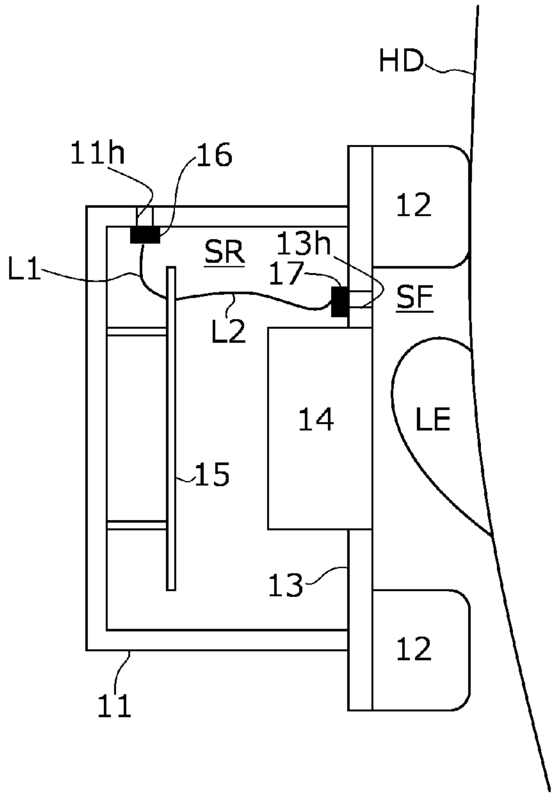
FIG. 2 is a schematic diagram illustrating a state in which the noise-cancelling headphone in FIG. 1 is worn on a head of a user.

FIG. 2 is a schematic diagram illustrating a state (worn state) in which the noise-cancelling headphone 1 is worn on the head (temporal region) of the user.

For convenience of description, the figure schematically illustrates the temporal region HD and the left ear LE. The figure illustrates that the front air chamber SF is formed between the noise-cancelling headphone 1 and the temporal region HD. The figure also illustrates that the front air chamber SF and the rear air chamber SR are separated by the baffle plate 13.

The "front air chamber SF" is an acoustic space (a space formed by the headphone unit 14, the baffle plate 13, the ear pad 12, and the temporal region HD) surrounded by the head (temporal region HD) of the user and the noise-cancelling headphone 1 in the worn state of the noise-cancelling headphone 1.

The "rear air chamber SR" is an acoustic space (a space formed by the housing 11, the baffle plate 13, and the headphone unit 14) surrounded by the housing 11, the baffle plate 13, and the headphone unit 14.

Further, FIG. 2 illustrates that a part of the ear pad 12 does not abut on the temporal region HD. That is, the figure indicates that a gap exists between the part of the ear pad 12 and the temporal region HD. The front air chamber SF communicates with the outside of the noise-cancelling headphone 1 through the gap.

Herein, in general, since shapes of human temporal region HD vary from person to person, the gap is likely to occur between the temporal region HD and the ear pad 12. When the gap occurs between the ear pad 12 and the temporal region HD, sound insulation of the noise-cancelling headphone 1 deteriorates and noise (hereinafter referred to as "external noise") outside the noise-cancelling headphone 1 enters the front air chamber SF (acoustic space) through the gap.

As illustrated in the figure, the noise-cancelling headphone 1 includes the headphone unit 14, a substrate 15, a first microphone 16, and a second microphone 17 inside the housing 11 (rear air chamber SR).

The headphone unit 14 converts the audio signal from the sound source into the sound wave corresponding to the audio signal and outputs the sound wave. The headphone unit 14 is attached to the baffle plate 13.

The substrate 15 mounts a noise-cancelling circuit (hereinafter referred to as "NC circuit"). The NC circuit is described in detail later.

The first microphone 16 collects external noise outside the housing 11 and generates a noise signal corresponding to the external noise. The first microphone 16 is, for example, a condenser microphone.

The "external noise" is sound that reaches the inside (rear air chamber SR) of the housing 11 and the front air chamber SF from a sound source different from the sound source such as the portable music player, for example, the outside of the noise-cancelling headphone 1. That is, the "external noise" is so-called noise.

The first microphone 16 is attached to the housing 11. The first microphone 16 is disposed at a position away from the headphone unit 14 and near the sound collecting hole 11*h* in the rear air chamber SR. A sound collecting portion of the first microphone 16 is exposed to the outside of the housing 11 through the sound collecting hole 11*h*. The first microphone 16 collects the external noise through the sound collecting hole 11*h*. The first microphone 16 is connected to the NC circuit mounted on the substrate 15 via a signal line L1.

Note that the configuration in which the sound collecting portion of the first microphone is exposed to the outside is not limited to the configuration to be exposed through the sound collecting hole (sound collecting hole 11*h*). That is, the first microphone may be disposed inside the sound collecting hole in such a way that the sound collecting portion (sound collecting surface) is continuous to an outer surface of the housing, for example.

The second microphone 17 collects noise (hereinafter referred to as "internal noise") inside the front air chamber SF at a position close to the ear of the user and generates a noise signal corresponding to the internal noise. The second microphone 17 is, for example, a condenser microphone.

The "internal noise" is external noise that enters the front air chamber SF through the gap between the ear pad 12 and the temporal region HD or through the ear pad 12.

The second microphone 17 is attached to the baffle plate 13. The second microphone 17 is disposed at a position not to be overlapped with the ear pad 12 and the headphone unit 14 in the rear air chamber SR. A sound collecting portion of the second microphone 17 is exposed to the front air chamber SF through the sound collecting hole 13*h*. The second microphone 17 collects the internal noise through the sound collecting hole 13*h*. The second microphone 17 is connected to the NC circuit mounted on the substrate 15 via a signal line L2.

Note that the configuration in which the sound collecting portion of the second microphone is exposed to the front air chamber is not limited to the configuration to be exposed through the sound collecting hole (sound collecting hole 13*h*). That is, the second microphone may be disposed inside the sound collecting hole in such a way that the sound collecting portion (sound collecting surface) is continuous to one surface of the baffle plate on the front air chamber side, for example.

Further, the second microphone may be disposed inside the front air chamber as long as the internal noise can be collected.

Figure 3:
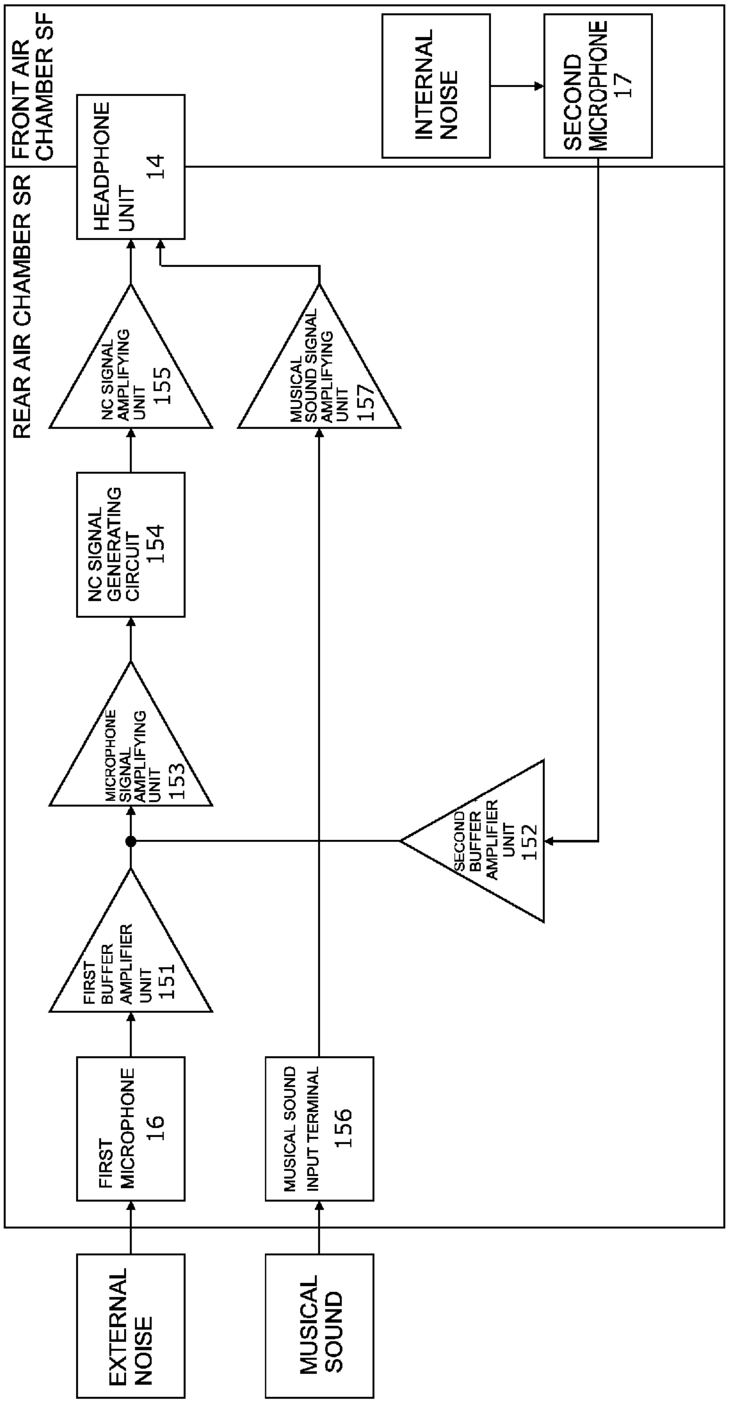
FIG. 3 is a schematic diagram illustrating a configuration of a noise-cancelling circuit included in the noise-cancelling headphone in FIG. 1.

FIG. 3 is a schematic diagram illustrating a configuration of the NC circuit included in the noise-cancelling headphone 1.

The NC circuit includes a first buffer amplifier unit 151, a second buffer amplifier unit 152, a microphone signal amplifying unit 153, a noise-cancelling signal generating circuit 154, a noise-cancelling signal amplifying unit 155, a musical sound input terminal 156, and a musical sound signal amplifying unit 157.

The first buffer amplifier unit 151 performs impedance conversion to the noise signal from the first microphone 16. The first buffer amplifier unit 151 outputs the impedance-converted noise signal to the microphone signal amplifying unit 153.

The second buffer amplifier unit 152 performs impedance conversion to the noise signal from the second microphone 17. The second buffer amplifier unit 152 outputs the impedance-converted noise signal to the microphone signal amplifying unit 153.

The microphone signal amplifying unit 153 amplifies a signal (hereinafter referred to as "combined signal") including the output signal (noise signal corresponding to the external noise) from the first buffer amplifier unit 151 and the output signal (noise signal corresponding to the internal noise) from the second buffer amplifier unit 152. The microphone signal amplifying unit 153 outputs the amplified combined signal to the noise-cancelling signal generating circuit (hereinafter referred to as "NC signal generating circuit") 154.

The NC signal generating circuit 154 generates a noise-cancelling signal, based on the output signal (combined signal amplified by the microphone signal amplifying unit 153) from the microphone signal amplifying unit 153. That is, the NC signal generating circuit 154 generates the noise-cancelling signal including a noise-cancelling signal based on the external noise collected by the first microphone 16 (noise-cancelling signal based on the signal from the first buffer amplifier unit 151) and a noise-cancelling signal based on the internal noise collected by the second microphone 17 (noise-cancelling signal based on the signal from the second buffer amplifier unit 152). In other words, the noise-cancelling signal generated by the NC signal generating circuit 154 includes the noise-cancelling signal in antiphase to the external noise and the noise-cancelling signal in antiphase to the internal noise. The NC signal generating circuit 154 outputs the noise-cancelling signal to the noise-cancelling signal amplifying unit 155 (hereinafter referred to as "NC signal amplifying unit").

Herein, the noise-cancelling signal in antiphase to the external noise is a signal to cancel the external noise. The noise-cancelling signal in antiphase to the internal noise is a signal to cancel the internal noise.

Further, the noise-cancelling signal in antiphase to the external noise is a first noise-cancelling signal in the present invention. The noise-cancelling signal in antiphase to the internal noise is a second noise-cancelling signal in the present invention.

The NC signal amplifying unit 155 amplifies the noise-cancelling signal (the first noise-cancelling signal, the second noise-cancelling signal) from the NC signal generating circuit 154. An output unit (not illustrated) of the NC signal amplifying unit 155 is connected to one input unit (not illustrated) of the headphone unit 14.

The audio signal (musical sound) from the sound source such as a portable music player is input to the musical sound input terminal 156. The musical sound input terminal 156 outputs the audio signal to the musical sound signal amplifying unit 157.

The musical sound signal amplifying unit 157 amplifies the audio signal from the musical sound input terminal 156. An output unit (not illustrated) of the musical sound signal amplifying unit 157 is connected to the other input unit (not illustrated) of the headphone unit 14.

The headphone unit 14 converts the audio signal from the sound source into the sound wave (sound wave corresponding to the audio signal) and outputs the sound wave as described above, and also converts the first noise-cancelling signal into a sound wave and converts the second noise-cancelling signal into a sound wave, and outputs the sound waves. That is, the headphone unit 14 outputs the sound wave corresponding to the musical sound signal and the sound waves corresponding to the noise-cancelling signals amplified by the NC signal amplifying unit 155.

Note that the second buffer amplifier unit may be an impedance conversion unit included in the second microphone. That is, for example, the second microphone includes a microphone unit that converts the internal noise into the noise signal and the impedance conversion unit that performs impedance conversion to the noise signal and outputs the impedance-converted noise signal. The impedance conversion unit of the second microphone functions as the second buffer amplifier unit. According to this configuration, the number of components included in the NC circuit is reduced.

Figure 4:
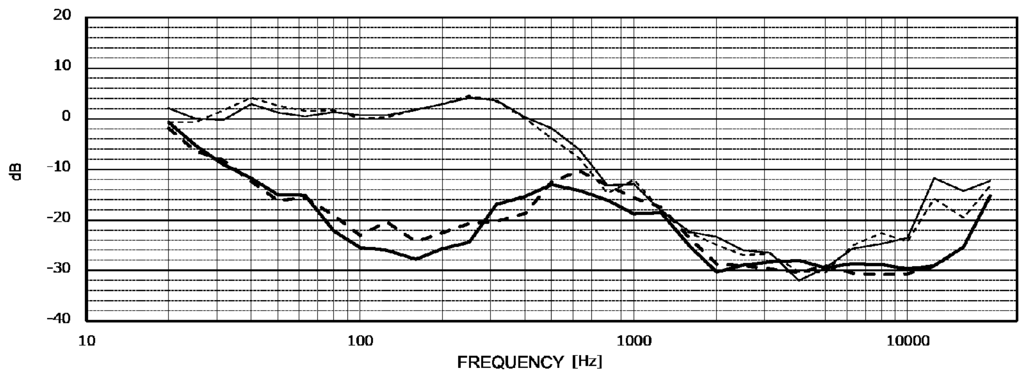
FIG. 4 is a graph illustrating a cancelling effect of the noise-cancelling headphone in FIG. 1.

FIG. 4 is a graph illustrating a cancelling effect of the noise-cancelling headphone 1.

The figure indicates a frequency characteristic (thin lines) when a noise-cancelling function of the noise-cancelling headphone 1 is off and the frequency characteristic (thick lines) when the same function is on. In the figure, the solid lines indicate the frequency characteristic of the left sound emitting unit 10 and the dashed lines indicate the frequency characteristic of the right sound emitting unit 20.

As illustrated in the figure, the noise-cancelling headphone 1 exhibits a cancelling effect of attenuating a gain by about 8 dB to 30 dB, particularly in a low frequency band (around 30 Hz to 500 Hz).

Figure 5:
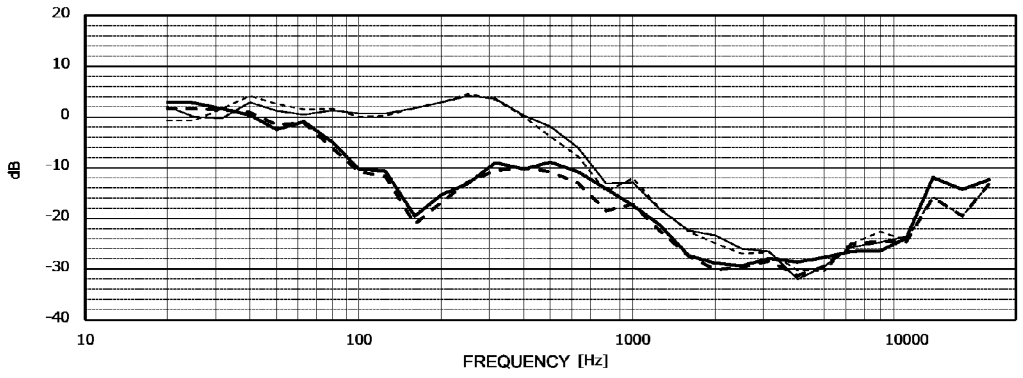
RELATED ART FIG. 5
FIG. 5 is a graph illustrating a cancelling effect of a conventional feedforward type noise-cancelling headphone.

FIG. 5 is a graph illustrating a cancelling effect of the conventional FF type noise-cancelling headphone.

The figure indicates the frequency characteristic (thin lines) when the noise-cancelling function of the conventional FF type noise-cancelling headphone is off and the frequency characteristic (thick lines) when the same function is on. In the figure, the solid lines indicate the frequency characteristic of the left sound emitting unit and the dashed lines indicate the frequency characteristic of the right sound emitting unit.

As illustrated in the figure, the conventional FF type noise-cancelling headphone exhibits the cancelling effect of attenuating a gain by about 6 dB to 24 dB in a low frequency band (around 80 Hz to 400 Hz). However, compared with the noise-cancelling headphone 1, the cancelling effect by the conventional FF type noise-cancelling headphone appears in a narrow frequency band, and the attenuation amount of the gain is small. In other words, the noise-cancelling headphone 1 exhibits the large cancelling effect in a wide range of frequency bands, as compared with the conventional FF type noise-cancelling headphone.

Herein, the principle in which the noise-cancelling headphone according to the present invention exhibits a higher canceling effect than the conventional FF type noise-cancelling headphone is described.

Figure 6:
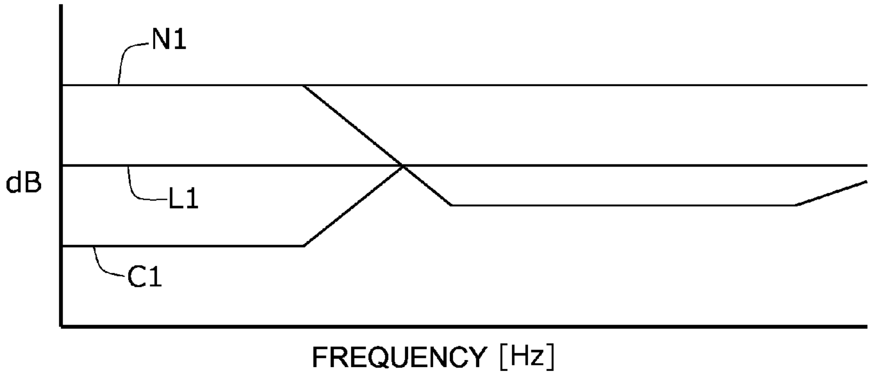
RELATED ART FIG. 6
FIG. 6 is a schematic diagram illustrating a state of cancellation in the conventional feedforward type noise-cancelling headphone in an ideal using state.

FIG. 6 is a schematic diagram illustrating a state of cancellation in the conventional FF type noise-cancelling headphone in an ideal using state.

Figure 7:
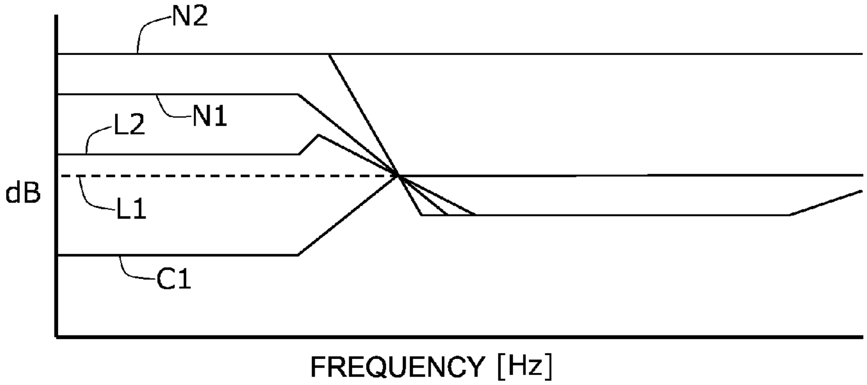
RELATED ART FIG. 7
FIG. 7 is a schematic diagram illustrating a state of cancellation in the conventional feedforward type noise-cancelling headphone in an actual using state.

FIG. 7 is a schematic diagram illustrating a state of cancellation in the conventional FF type noise-cancelling headphone in an actual using state.

The noise-cancelling headphone is worn on the head of the user, thereby causing a so-called passive effect in which noise in a high frequency band (high frequency component) is muted (cancelled) due to shielding by the ear pad. That is, in the ideal using state (hereinafter referred to as "ideal state"), when the noise-cancelling headphone is worn on the head of the user, the high frequency component is muted (cancelled) by the ear pad, and the high frequency component does not reach the front air chamber. In contrast, the passive effect is not sufficiently obtained for noise in a low frequency band (low frequency component) of the external noise, and thus such noise reaches the front air chamber in a state where the sound volume is reduced. That is, a headphone without noise-cancelling function has little passive effect. The noise-cancelling signal generating circuit (NC signal generating circuit) included in the conventional FF type noise-cancelling headphone functions to cancel the low frequency component of the external noise that reaches the front air chamber due to the little passive effect. The conventional noise-cancelling signal generating circuit performs, with respect to the collected external noise, signal processing in consideration of the volume reduction amount due to the passive effect in the ideal state, generates a noise signal, and generates a noise-cancelling signal in antiphase to the generated noise signal. As illustrated in FIG. 6, external noise in a low frequency band (N1) is cancelled by a generated noise-cancelling signal (C1). As a result, the external noise is muted (cancelled) to a predetermined muting level (L1).

However, the conventional noise-cancelling signal generating circuit (NC signal generating circuit) in the ideal state is designed assuming the passive effect in the ideal state in which the head (temporal region) of the user and the ear pad is in close contact without any gap (the state in which the front air chamber is sealed). The conventional noise-cancelling signal generating circuit in the ideal state generates a cancelling signal, based on a reference characteristic with this assumption as a standard. That is, when the passive effect as assumed is not obtained due to the gap between the head (temporal region) of the user and the ear pad, the conventional noise-cancelling signal generating circuit generates the cancelling signal (C1), based on the external noise (N1) when the passive effect is obtained according to the reference characteristic. As a result, as illustrated in FIG. 7, a part (L2) of the external noise in the low frequency band remains in the front air chamber without being cancelled by the generated cancelling signal (C1). That is, the part of the external noise is not cancelled, and the user cannot obtain a sufficient effect of the noise-cancelling headphone. Note that, in FIG. 7, N2 indicates the external noise that actually reaches the front air chamber.

Figure 8:
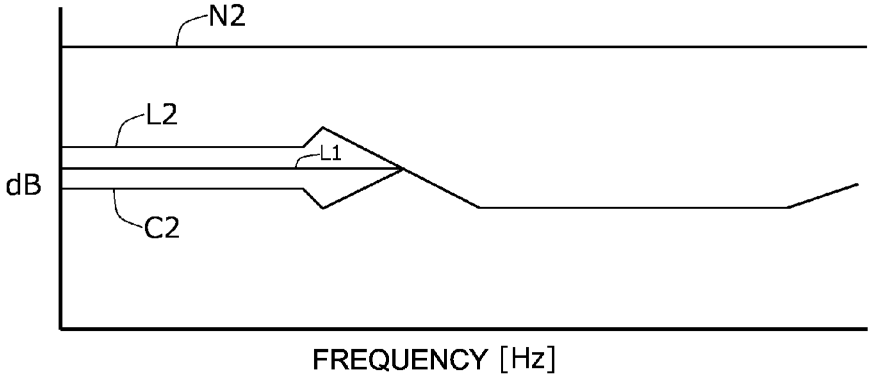
FIG. 8 is a schematic diagram illustrating a state of cancellation in the noise-cancelling headphone according to the present invention.

FIG. 8 is a schematic diagram illustrating a state of cancellation in the noise-cancelling headphone according to the present invention.

In the noise-cancelling headphone according to the present invention, the second microphone collects, as the internal noise, the part (L2) of the external noise in the low frequency band that remains without being cancelled in the conventional FF type noise-cancelling headphone in the actual using state illustrated in FIG. 7, and an antiphase noise-cancelling signal (C2) including the collected internal noise is generated. As a result, the noise that is not completely cancelled and remains, as the internal noise, in the conventional FF type noise-cancelling headphone in the actual using state is muted to the predetermined muting level (L1).

Thus, the noise-cancelling headphone according to the present invention generates the cancelling signal corresponding to the internal noise collected by the second microphone in addition to the external noise collected by the first microphone. As a result, the noise-cancelling headphone according to the present invention exhibits a higher cancelling effect than the conventional FF type noise-cancelling headphone.

Figure 9:
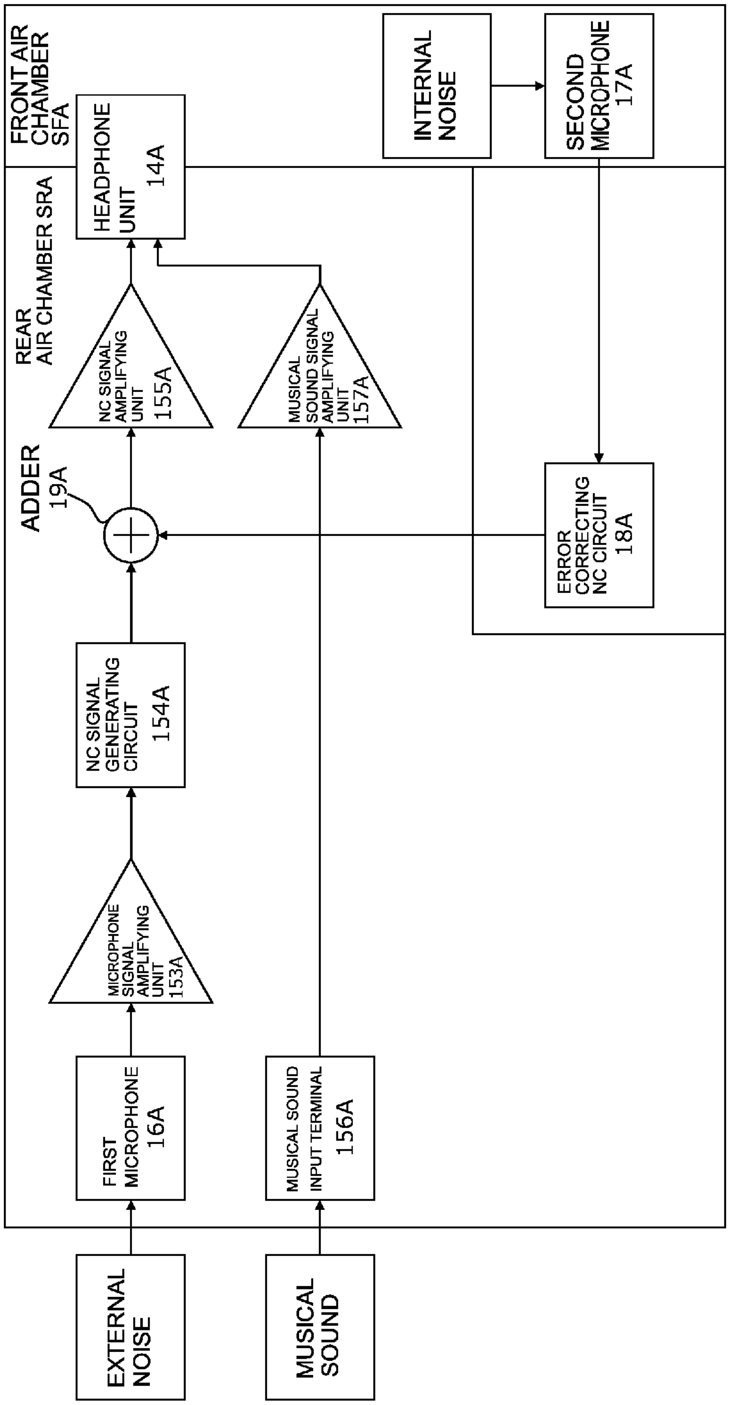
FIG. 9 is a schematic diagram illustrating a configuration of a noise-cancelling circuit included in a conventional hybrid type noise-cancelling headphone.

FIG. 9 is a schematic diagram illustrating a configuration of an NC circuit included in the conventional hybrid type noise-cancelling headphone.

A front air chamber SFA and a rear air chamber SRA illustrated in the figure are spaces corresponding to the front air chamber SF and the rear air chamber SR illustrated in FIG. 3, respectively.

The NC circuit included in the conventional hybrid type noise-cancelling headphone (hereinafter referred to as "conventional NC circuit") includes a microphone signal amplifying unit 153A, an NC signal generating circuit 154A, an NC signal amplifying unit 155A, a musical sound input terminal 156A, a musical sound signal amplifying unit 157A, an error correcting NC circuit 18A, and an adder 19A. That is, the conventional NC circuit includes the error correcting NC circuit 18A and the adder 19A as compared with the NC circuit included in the noise-cancelling headphone 1 illustrated in FIG. 3.

The musical sound input terminal 156A, the musical sound signal amplifying unit 157A, a first microphone 16A, and a second microphone 17A illustrated in the figure have the same functions and configurations as the musical sound input terminal 156, the musical sound signal amplifying unit 157, the first microphone 16, and the second microphone 17 illustrated in FIG. 3, respectively. Therefore, a specific description of each of the musical sound input terminal 156A, the musical sound signal amplifying unit 157A, the first microphone 16A, and the second microphone 17A are omitted.

The microphone signal amplifying unit 153A amplifies a noise signal from the first microphone 16A.

The NC signal generating circuit 154A generates a noise-cancelling signal, based on an output signal from the microphone signal amplifying unit 153A. The NC signal generating circuit 154A generates a noise-cancelling signal in antiphase to the external noise collected by the first microphone 16A. The NC signal generating circuit 154A outputs the noise-cancelling signal to the NC signal amplifying unit 155A via the adder 19A. The adder 19A and the NC signal amplifying unit 155A are described later.

In particular, the error correcting NC circuit 18A generates an error correcting signal for cancelling noise (hereinafter referred to as "error noise") that has not been completely muted by the cancelling signal corresponding to the noise signal from the first microphone 16A. The second microphone 17A collects the error noise, generates a noise signal corresponding to the error signal, and outputs the noise signal to the error correcting NC circuit 18A. The error correction NC circuit 18A outputs the error correcting signal to the adder 19A.

The adder 19A adds the noise-cancelling signal from the NC signal generating circuit 154A and the error correcting signal from the error correcting NC circuit 18A. The adder 19A outputs the added signal to the NC signal amplifying unit 155A.

The NC signal amplifying unit 155A amplifies the added signal (noise-cancelling signal and error correcting signal) generated by adding in the adder 19A. An output unit (not illustrated) of the NC signal amplifying unit 155A is connected to one input unit (not illustrated) of a headphone unit 14A.

As illustrated in FIG. 9, the NC circuit included in the conventional hybrid type noise-cancelling headphone includes the second microphone 17A, the error correcting NC circuit 18A, and the adder 19A, in addition to the NC circuit included in the conventional FF type noise-cancelling headphone.

In contrast, the NC circuit (see FIG. 3) included in the noise-cancelling headphone 1 includes the second microphone 17 and the second buffer amplifier unit 152, in addition to the NC circuit included in the conventional FF type noise-cancelling headphone. That is, the second microphone 17 and the second buffer amplifier unit 152 function as a filter to mute the noise through the gap between the head (temporal region) of the user and the ear pad. Further, the second microphone 17 and the second buffer amplifier unit 152 automatically correct the noise-cancelling signal with respect to noise unique to a user caused by an individual variation of the gap between the head (temporal region) of the user and the ear pad.

Note that the second buffer amplifier unit may be the impedance conversion unit included in the second microphone as described above. In this case, the NC circuit included in the noise-cancelling headphone according to the present invention is configured by adding only the second microphone to the NC circuit included in the conventional FF type noise-cancelling headphone. That is, the noise-cancelling headphone according to the present invention reduces the signal processing according to the noise signal and achieves the cancelling effect equivalent to the conventional hybrid type with a simple NC circuit.

According to the embodiments described above, the NC circuit included in the noise-cancelling headphone according to the present invention does not require an expensive error correcting NC circuit nor an adder with a complex configuration unlike the NC circuit included in the conventional hybrid type noise-cancelling headphone. That is, the NC circuit noise-cancelling headphone according to the present invention has a simple configuration as compared with the NC circuit included in the conventional hybrid type noise-cancelling headphone. Meanwhile, the noise-cancelling headphone according to the present invention achieves a higher cancelling effect than the conventional FF type noise-cancelling headphone. As described above, the noise-cancelling headphone according to the present invention achieves a high cancelling effect with a simple configuration.

REFERENCE SIGNS LIST

1 NOISE-CANCELLING HEADPHONE
10 LEFT SOUND EMITTING UNIT
11 HOUSING
11*h* SOUND COLLECTING HOLE (FIRST SOUND COLLECTING HOLE)
12 EAR PAD
13 BAFFLE PLATE
13*h* SOUND COLLECTING HOLE (SECOND SOUND COLLECTING HOLE)
14 HEADPHONE UNIT
15 SUBSTRATE
151 FIRST BUFFER AMPLIFIER UNIT
152 SECOND BUFFER AMPLIFIER UNIT
153 MICROPHONE SIGNAL AMPLIFYING UNIT
154 NOISE-CANCELLING SIGNAL GENERATING CIRCUIT (NC SIGNAL GENERATING CIRCUIT)
155 NOISE-CANCELLING SIGNAL AMPLIFYING UNIT (NC SIGNAL AMPLIFYING UNIT)
156 MUSICAL SOUND INPUT TERMINAL
157 MUSICAL SOUND SIGNAL AMPLIFYING UNIT
16 FIRST MICROPHONE
17 SECOND MICROPHONE
20 RIGHT SOUND EMITTING UNIT
21 HOUSING
22 EAR PAD
23 BAFFLE PLATE
30 CONNECTING MEMBER
SF FRONT AIR CHAMBER
SR REAR AIR CHAMBER

The invention claimed is:

1. A noise cancelling headphone comprising:
a headphone unit configured to output a sound wave corresponding to an audio signal;
a baffle plate to which the headphone unit is attached;
an ear pad attached to the baffle plate;
a housing attached to the baffle plate;
a first microphone configured to collect external noise outside the housing,
a first buffer amplifier unit configured to perform impedance conversion to a signal from the first microphone and output the impedance-converted signal;

a second microphone configured to collect internal noise inside a front air chamber formed by the headphone unit, the baffle plate, the ear pad, and a head of a user when the noise cancelling headphone is worn on the user's head;

a second buffer amplifier unit configured to perform impedance conversion to a signal from the second microphone and output the impedance-converted signal; and a noise cancelling signal generation circuit configured to generate a noise cancelling signal, based on a combined signal by combining a signal from the first buffer amplifier unit with a signal from the second buffer amplifier unit.

2. The noise cancelling headphone according to claim 1, wherein the noise cancelling signal includes a first noise cancelling signal in antiphase to the external noise, and a second noise cancelling signal in antiphase to the internal noise.

3. The noise cancelling headphone according to claim 1 further comprising:

a microphone signal amplifying unit configured to amplifying the combined signal, wherein the noise cancelling signal generating circuit generates the noise cancelling signal, based on the combined signal amplified by the microphone signal amplifying unit.

4. The noise cancelling headphone according to claim 1, wherein the second buffer amplifier unit is an impedance converter included in the second microphone.

5. The noise cancelling headphone according to claim 1, wherein the first microphone is arranged inside a rear air chamber formed by the headphone unit, the baffle plate, and the housing.

6. The noise cancelling headphone according to claim 1, wherein the first microphone is attached to the housing, and a sound collecting portion of the first microphone is exposed to the outside of the housing.

7. The noise cancelling headphone according to claim 1, wherein the second microphone is attached to the baffle plate, and a sound collecting portion of the second microphone is exposed to the front air chamber.

* * * * *